Feb. 8, 1938.   M. C. TEVES ET AL   2,107,352
PHOTOTUBE
Filed March 10, 1936
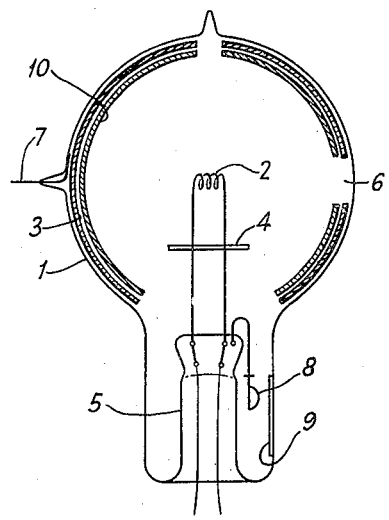
INVENTOR.
MARTEN CORNELIS TEVES
JAN HENDRIK DE BOER
BY Charles M<sup>c</sup>Clair
ATTORNEY.

Patented Feb. 8, 1938

2,107,352

UNITED STATES PATENT OFFICE 2,107,352

PHOTOTUBE

Marten Cornelis Teves and Jan Hendrik de Boer, Eindhoven, Netherlands, assignors to N. V. Philips' Gloeilampenfabrieken, Eindhoven, Netherlands Application March 10, 1936, Serial No. 68,015
In Germany March 14, 1935

5 Claims. (Cl. 250—27.5)

Our invention relates to light sensitive electron discharge devices, more particularly to an improved method of manufacturing photocathodes for phototubes.

The principal object of our invention is to provide an improved method of manufacturing light sensitive electron discharge devices, particularly the photoelectrode of such devices.

According to the present invention, we provide a method in which it is not necessary to remove the excess of photoelectric metal from the tube envelope. A photoelectric electrode is produced by partly decomposing a layer of a completely oxidized photoelectric metal (preferably caesium) by submitting said layer as an electrode (preferably as the cathode) to an electric discharge in an inert gas, the oxygen set free during this decomposition being taken up by a getter, preferably barium or calcium, provided outside the layer.

The layer of completely oxidized photoelectric metal, which forms the starting point in the decomposition, may be obtained, for example, by providing in the discharge tube a layer of the photoelectric metal which may be introduced by vaporization into the discharge tube or may be liberated within the tube from a compound. This layer of photoelectric metal may be completely oxidized by means of an atmosphere containing oxygen so that photoelectric metal is no longer present as such in the discharge tube. For this purpose, an excessive amount of oxygen may be introduced into the discharge tube and after the oxidation of the photoelectric metal the excess of oxygen may be removed with the aid of a pump.

Alternatively, one may start with a layer of a non-photoelectric metal, e. g. silver, which is oxidized either entirely or partially whereupon the photoelectric metal is applied to the oxidized metal layer and the metal oxide is reduced by the photoelectric metal with the result that a mixture of non-photoelectric metal particles, for example silver particles, and the oxide of the photoelectric metal is obtained. In order to convert into oxide any photoelectric metal which might not yet have been oxidized, oxygen may be admitted into the tube, the excess of oxygen being removed with the aid of a pump.

After the layer of completely oxidized photoelectric metal (mixed with other substances, for example the above mentioned silver particles) has been obtained the discharge tube is filled with gas, preferably rare gas, which is inert with respect to the photoelectric metal. In this gas filling is brought about an electric discharge in which the oxide layer acts as an electrode. Owing to this discharge the oxide of the photoelectric metal is partly decomposed, the oxygen liberated being taken up by the oxygen getter provided outside the oxide layer. Care should be taken to ensure that this getter cannot be attacked by the oxygen introduced into the discharge tube for the oxidation of the photoelectric metal. To that end, the oxygen getter may be introduced into the tube in such a condition, for example in the form of a compound mixed with a reducing agent, that no oxygen can be taken up and that it is converted into its operative condition only after the photoelectric metal has been oxidized and the excess of oxygen has been removed from the discharge tube. Use may be made, for example, of a capsule containing a mixture of barium chromate and zirconium. A high-frequency heating of the capsule may be used so that the barium compound is reduced by the zirconium and the barium is vaporized from the capsule. Use may also be made of so-called "copper plated barium" i. e. barium enclosed as such by a metallic envelope, for example, of copper.

The photoelectric metal particles produced by the decomposition of part of the photoelectric metal oxide mixed with the oxide particles left forms on the surface of the oxide layer as a thin adsorbed layer of the photoelectric metal. The degree of the decomposition of the metal oxide can be controlled in a reproducible manner by determining the intensity of the discharge current and the duration of the discharge. The number of coulombs sent through the tube during this discharge is a direct measure for the amount of decomposed oxide. Thus one obtains in a completely reproducible manner a sensitive photoelectric electrode without any need to remove an excess of photoelectric metal after said electrode has been formed.

The electrode formed possesses very satisfactory photoelectrical properties and may consequently be utilized as the cathode of a photoelectric tube and be irradiated with light in this case. The electrode may also be utilized, however, for other purposes, for example for the supply of a secondary emission current. As is well-known, such electrodes, when struck by electrons or ions, emit secondary electrons.

The novel features which we believe to be characteristic of our invention are set forth with particularity in the appended claims, but the invention itself will best be understood by reference to the following description taken in connection with the accompanying drawing in which the single figure in the drawing is a diagrammatic representation of a light sensitive electron discharge device made according to our invention.

The photo-electric tube is provided with an envelope 1 containing a filament 2 coated with some silver prior to its mounting within the envelope. After the envelope has been exhausted an electric current is sent through the filament 2 which results in vaporizing the silver present thereon. The silver vaporized condenses on the wall in the form of a layer 3. A screen 4 prevents the silver from depositing on the press 5. A similar screen (not shown in the drawing) may be used to provide a window 6 in the silver layer 3. This layer 3 is in contact with a metal wire 7 taken out through the wall of the envelope.

After the silver layer 3 has been formed, oxygen is admitted into the tube and a discharge is brought about in this oxygen atmosphere between the layer 3 which acts as a cathode and the filament 2 which acts as an anode, which results in the layer 3 becoming superficially oxidized. After sufficient oxidation of the silver the excess oxygen is removed from the envelope with the aid of a pump.

Subsequently, caesium is introduced into the tube, for example, by distillization. This caesium settles on the layer of silver oxide. Then the tube is heated to such an extent that the silver oxide is reduced by the caesium with the result that a layer is obtained which consists of a mixture of caesium oxide particles and silver particles. Subsequently, oxygen is admitted into the envelope for the oxidation of any caesium which may still be present in the tube. The excess of oxygen is removed with the aid of a pump. Then, a metallic capsule 8 containing a mixture of barium chromate and zirconium is heated with the aid of a high-frequency alternating current. Owing to this heating this barium compound is reduced and the barium liberated is vaporized from the capsule. The barium vaporized settles in the form of a mirror 9 on the wall of the envelope.

Subsequently, argon is introduced into the tube, for example at a pressure of 0.1 mm. Between the filament 2 acting as an anode and the oxide layer formed on the silver layer 3 and acting as a cathode an electric discharge in argon is established by which the caesium oxide is decomposed into caesium and oxygen while the oxygen liberated is taken up by the barium mirror 9. The caesium particles produced are mixed with the caesium oxide particles that are left and with the silver particles already mixed with the oxide. This mixed layer is denoted in the drawing by 10. Besides, a number of caesium particles liberated settle on the mixed layer with the result that a very thin, frequently even less than atomically occupied, adsorbed layer of photoelectric metal is obtained. The filling of argon introduced into the envelope may be removed from the latter whereupon the tube may be utilized as a high vacuum phototube. If in normal operation a gas filling should also be desired in the tube, said argon may remain in the tube or the latter may be furnished with a new filling.

While we have indicated the preferred embodiments of our invention of which we are now aware and have also indicated only one specific application for which our invention may be employed, it will be apparent that our invention is by no means limited to the exact forms illustrated or the use indicated, but that many variations may be made in the particular structure used and the purpose for which it is employed without departing from the scope of our invention as set forth in the appended claims.

We claim:

1. The method of manufacturing a photoelectric cathode for a light sensitive device having an envelope and an electrode positioned within said envelope, comprising forming a non-photoelectric metal and photoelectric-metal-oxide base within said envelope, releasing a getter material within said envelope, establishing a discharge between the non-photoelectric metal and photoelectric metal oxide base and said electrode in the presence of an inert gas to partially reduce said photo electric metal oxide whereby a thin layer of adsorbed photoelectric metal is formed on the non photoelectric metal and photoelectric metal oxide base, said getter absorbing the oxygen released during said discharge.

2. The method of manufacturing a photoelectric cathode for a light sensitive device having an envelope and an electrode positioned within said envelope, comprising forming a silver and caesium oxide base within said envelope, releasing barium within said envelope, establishing a discharge between the silver and caesium oxide base and said electrode in the presence of an inert gas to partially reduce said caesium oxide whereby a thin adsorbed layer of caesium is obtained on the silver and caesium oxide base, the barium absorbing the oxygen released during said discharge.

3. The method of manufacturing a photoelectric cathode for a light sensitive device having an envelope and an electrode positioned within said envelope, comprising forming an oxidized silver base within said envelope, depositing caesium on said silver oxide base, applying heat to reduce the silver oxide base by means of said caesium, completely oxidizing said caesium to produce a reduced silver and caesium oxide layer, establishing a discharge between the reduced silver base and said electrode in the presence of an inert gas to partially reduce said caesium oxide whereby a thin adsorbed layer of caesium is obtained on the reduced silver and caesium oxide layer and taking up the oxygen set free during said discharge by means of a getter.

4. The method of manufacturing a photoelectric cathode in a phototube having an envelope containing an electrode, comprising forming an oxidized layer of silver on the wall of the envelope of the tube, depositing a caesium layer on said silver oxide base, reducing the silver oxide by means of said caesium by the application of heat introducing oxygen into said envelope to completely oxidize said caesium, introducing barium into the envelope of said tube, establishing a discharge between the layer on the envelope wall and the electrode in the presence of argon to partially reduce the caesium oxide whereby a thin layer of caesium is formed on the caesium oxide and silver base, said barium absorbing the oxygen released during said discharge.

5. The method of manufacturing a photoelectric cathode in a light sensitive device having an envelope containing an electrode, comprising forming a silver oxide layer on the wall of the envelope, reducing the silver oxide by means of caesium, completely oxidizing said caesium by the introduction of oxygen, releasing a getter material within said envelope, establishing a discharge between the reduced silver oxide layer and the electrode in the presence of argon to partially reduce the caesium oxide to form a thin layer of absorbed caesium on the reduced silver oxide and caesium oxide base, said getter material absorbing the oxygen released by said discharge.

MARTEN CORNELIS TEVES.
JAN HENDRIK DE BOER.